Jan. 4, 1955    W. J. BUEDINGEN    2,698,470
DEVICE FOR FASTENING PICTURES IN FRAMES
Filed Aug. 9, 1952

INVENTOR.
W. J. BUEDINGEN
BY
ATTORNEY

# United States Patent Office 2,698,470
Patented Jan. 4, 1955

2,698,470

DEVICE FOR FASTENING PICTURES IN FRAMES

William John Buedingen, Rochester, N. Y.

Application August 9, 1952, Serial No. 303,596

1 Claim. (Cl. 24—73)

The present invention relates to fastening devices and more particularly to devices for fastening pictures in frames. In a more specific aspect, the invention relates to devices for securing canvas paintings in wooden picture frames.

When a painting is being made on canvas the canvas is first stretched on and fastened to a wooden stretcher frame. When the painting is completed it may be mounted in a wooden picture frame.

Heretofore it has been the universal practice in mounting the painting in a picture frame to employ a rabbeted picture frame and to secure the stretched painting in position by driving small brads or nails through the stretcher frame into the picture frame. For an ordinary size picture about six brads are required for each of the long sides of the painting and about four along each of the short sides. The brads take time to drive and not infrequently split the picture frame. Moreover, when the painting has to be removed from the picture frame it is a difficult job to pull the brads out.

The primary object of the present invention is to provide a greatly simplified mode of fastening a picture, such as a painting, in a picture frame.

Another object of the invention is to provide a means for fastening a picture in a picture frame which can readily be engaged with the picture frame without tools, and which will securely hold a picture in a picture frame.

Another object of the invention is to provide means for fastening a picture in a picture frame which will permit of expeditious substitution of a picture in the picture frame without requiring tools, and without necessitating any skill.

Another object of the invention is to provide a means for fastening pictures in picture frames which will not split or mar the picture frame.

Another object of the invention is to provide a means for fastening pictures in picture frames which will reduce to a minimum the number of fastening devices required to securely retain the picture in the picture frame.

Other objects of the invention will be apparent hereinafter from the specification and from the recital of the appended claim.

Figure 1:
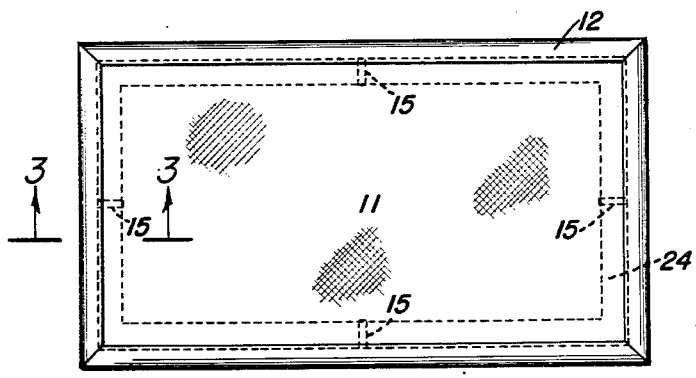
Fig. 1 is a front elevation showing a canvas-supporting stretcher frame secured in a picture frame by fastening devices made according to one embodiment of the present invention.
Figure 2:
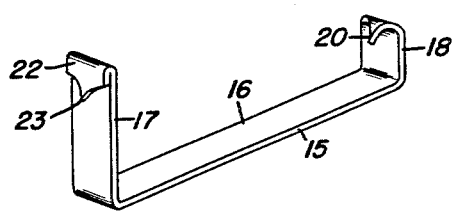
Fig. 2 is a perspective view of a fastening device made according to one embodiment of the present invention.
Figure 3:
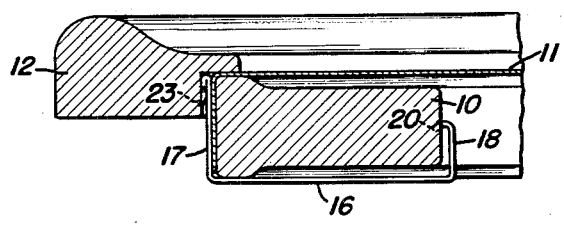
Fig. 3 is an enlarged section taken on the line 3—3 of Fig. 1, looking in the direction of the arrows.

In the drawing, 10 denotes an ordinary wooden stretcher frame on which the canvas 11 of a painting is stretched and to which it is secured in conventional manner. 12 denotes a conventional picture frame which may be of any suitable shape and which has a rabbet or groove 14 in which the stretcher frame 10 with the canvas 11 secured thereto is mounted.

For securing the stretcher frame 10 to the picture frame 12, I employ a plurality of fastening devices 15, four in the instance illustrated in Fig. 1. These fastening devices comprise metal straps made of flat stock and bent into generally U-shape. The fastener comprises, therefore, a base portion 16, and two parallel legs 17 and 18 which extend perpendicular to the base. The leg 18 is shorter than the leg 17 and its free end is turned inwardly and downwardly and shaped to provide a prong 20. The longer leg 17 is reversely bent at its free end and turned downwardly and outwardly to provide a downturned portion 22 from which there projects laterally an integral, sharp prong portion 23.

Figure 4:
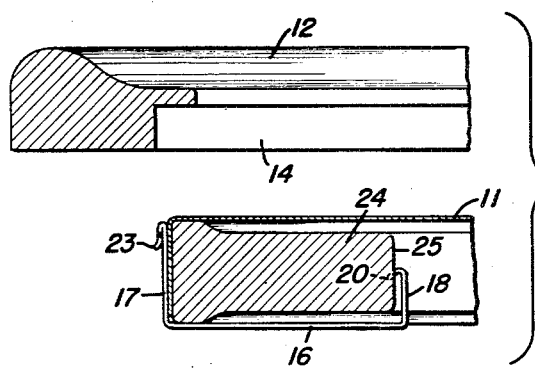
Fig. 4 is an exploded fragmentary section on the same scale as Fig. 3, showing the stretcher frame separated from the picture frame but with a fastening device secured to the stretcher frame so that the painting is ready for insertion into the picture frame.

For fastening a stretcher frame 10 in a picture frame 12 fastening devices 15 are chosen, the length of whose base 16 suits the width of the side strips 24 of the stretcher frame, the base 16 of the fastener being just enough longer than the width of strips 24 to permit prong 20 to engage securely in the inside 25 of a strip 24 while the leg 17 of the fastener seats against the downturned end of the canvas stretched on the stretcher frame, as shown in Fig. 4. Each fastener is slipped over the stretcher frame from the back, and first pushed laterally toward the outside of the stretcher frame to engage the hooked portion 20 of the short leg 18 of the fastener in the inside 25 of a strip 24 of the stretcher frame, as shown in the exploded view of Fig. 4. Then the fastener will frictionally engage the strip 24 also along its leg 17. The fastener may be made resilient if desired to enhance its frictional engagement with the stretcher frame. Having mounted the required number of fasteners 15 on the stretcher frame, the stretcher frame with the fasteners secured thereto is pushed into the rabbet 14 of the picture frame. The reversely bent portions 22 of the fasteners are sufficiently resilient to yield so that the stretcher frame can readily be pushed into the rabbet. When the stretcher frame is in position in the rabbet, the resilience of the reversely bent portions 22 of the fastener force the prongs 23 into the picture frame 12 to secure the stretcher frame in the picture frame. Engagement of the prongs 23 in the picture frame may be made more certain by pushing the stretcher frame laterally outwardly to force each prong into the adjacent portion of the picture frame. The prongs 23 hold the stretcher frame in the picture frame securely against any direct outward pull because once engaged with the picture frame they resist outward pull.

It is an easy matter, however, to disengage the stretcher frame from the picture frame. If but two of my fasteners are used for holding the stretcher frame in the picture frame, the prong 20 of one fastener can be unhooked manually, and this fastener can then be rocked to disengage it from the picture frame; then the stretcher frame can readily be slid out of the picture frame to disengage the other fastener. If four fasteners are used, it is best to disengage the prongs 20 of two of the fasteners. Then the stretcher frame can be rocked outwardly disengaging the other fasteners.

It will be seen, therefore, that I have provided a device for fastening stretcher frames in picture frames which will securely hold a stretcher frame in a picture frame but which requires no tools either for fastening the stretcher frame into the picture frame or for removing the stretcher frame from the picture frame. Furthermore, I have provided a device which will hold the stretcher frame so securely in a picture frame that instead of requiring approximately twenty brads to hold an ordinary size stretcher frame in an ordinary size picture frame, only four of my fastening devices need be used, as shown in Fig. 1. My fastening devices will not split the picture frame, but will hold a stretcher frame securely in the picture frame.

While the invention has been described specifically in connection with the fastening of canvas-holding stretcher frames in picture frames, it will be understood that it may be used for fastening other type pictures in picture frames, and, in fact, may be used for other fastening purposes. While the invention has been described, therefore, in connection with a specific embodiment thereof, and a particular use therefor, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claim.

Having thus described my invention, what I claim is:

A device for securing a stretcher frame or the like in a rabbeted picture frame, said device comprising a generally U-shaped metal strap having a base portion and two spaced parallel legs projecting forwardly from opposite ends of the base portion, said base portion being long enough to straddle the width of a side strip of the stretcher frame, one of said legs being shorter than the other, the shorter leg being of less height than the thickness of the side strip and being bent at its free end inwardly toward the other leg and toward the base portion and having its free end pointed to form a prong engageable in said side strip at the inside thereof, and the longer leg being bent at its free end and turned outwardly and having its free end pointed to form a flexible prong engageable with the inside of the picture frame between the outside surface of the side strip and the adjacent inside surface of the picture frame.

References Cited in the file of this patent

UNITED STATES PATENTS

| | | |
|---|---|---|
| 2,245,510 | Turley | June 10, 1941 |
| 2,275,683 | Rutledge | Mar. 10, 1942 |
| 2,283,814 | La Place | May 19, 1942 |
| 2,537,930 | Hall | Jan. 9, 1951 |